(12) United States Patent
Bradstreet

(10) Patent No.: US 9,021,737 B1
(45) Date of Patent: May 5, 2015

(54) ILLUMINATING FISHING POLE

(76) Inventor: Edward D Bradstreet, Lake, MI (US)

( * ) Notice: Subject to any disclaimer, the term of this patent is extended or adjusted under 35 U.S.C. 154(b) by 485 days.

(21) Appl. No.: 13/437,976

(22) Filed: Apr. 3, 2012

(51) Int. Cl.
*A01K 87/08* (2006.01)
*A01K 87/00* (2006.01)

(52) U.S. Cl.
CPC .................. *A01K 87/00* (2013.01); *A01K 87/08* (2013.01)

(58) Field of Classification Search
CPC ....................................................... A01K 87/007
USPC .................................. 43/17.5, 17, 18.1 R, 25
See application file for complete search history.

(56) References Cited

U.S. PATENT DOCUMENTS

| 4,085,437 | A | * | 4/1978 | Hrdlicka et al. | ............. 362/109 |
| D349,748 | S | | 8/1994 | Lucero | |
| 5,586,403 | A | * | 12/1996 | Ward | ............................ 43/17.5 |
| 5,826,366 | A | | 10/1998 | Matibe | |
| D403,736 | S | | 1/1999 | Dunn | |
| 5,855,084 | A | | 1/1999 | Huddleston | |
| 6,742,911 | B1 | * | 6/2004 | Chen | ............................. 362/206 |
| 6,908,216 | B2 | * | 6/2005 | Love | ............................. 362/253 |
| 7,337,577 | B1 | | 3/2008 | Ramirez | |
| 2006/0288629 | A1 | | 12/2006 | Parker | |
| 2008/0250691 | A1 | * | 10/2008 | Barnes et al. | ..................... 43/17 |
| 2010/0281753 | A1 | | 11/2010 | Gonzagowski | |
| 2012/0227307 | A1 | * | 9/2012 | Cuevas et al. | .................. 43/17.5 |

* cited by examiner

*Primary Examiner* — Christopher P Ellis

(57) ABSTRACT

The illuminating fishing pole involves a kit that when installed provides illumination down the length of the fishing pole and at a distal end. A first illuminating member attaches to the handle portion of the fishing pole via a bracket that clips thereon. The first illuminating member directs light down the length of the fishing pole, and includes wiring that extends therefrom, through the interior of the fishing pole, and down to the second distal end where a second illuminating means is provided. The second illuminating means directs light away from the fishing pole and in the direction of casting a fishing line from said fishing pole. The wiring includes a connector to enable disconnection of the first illuminating means from the fishing pole. The first illuminating means includes a powering means and two on/off switches to control operation of each illuminating means.

5 Claims, 5 Drawing Sheets

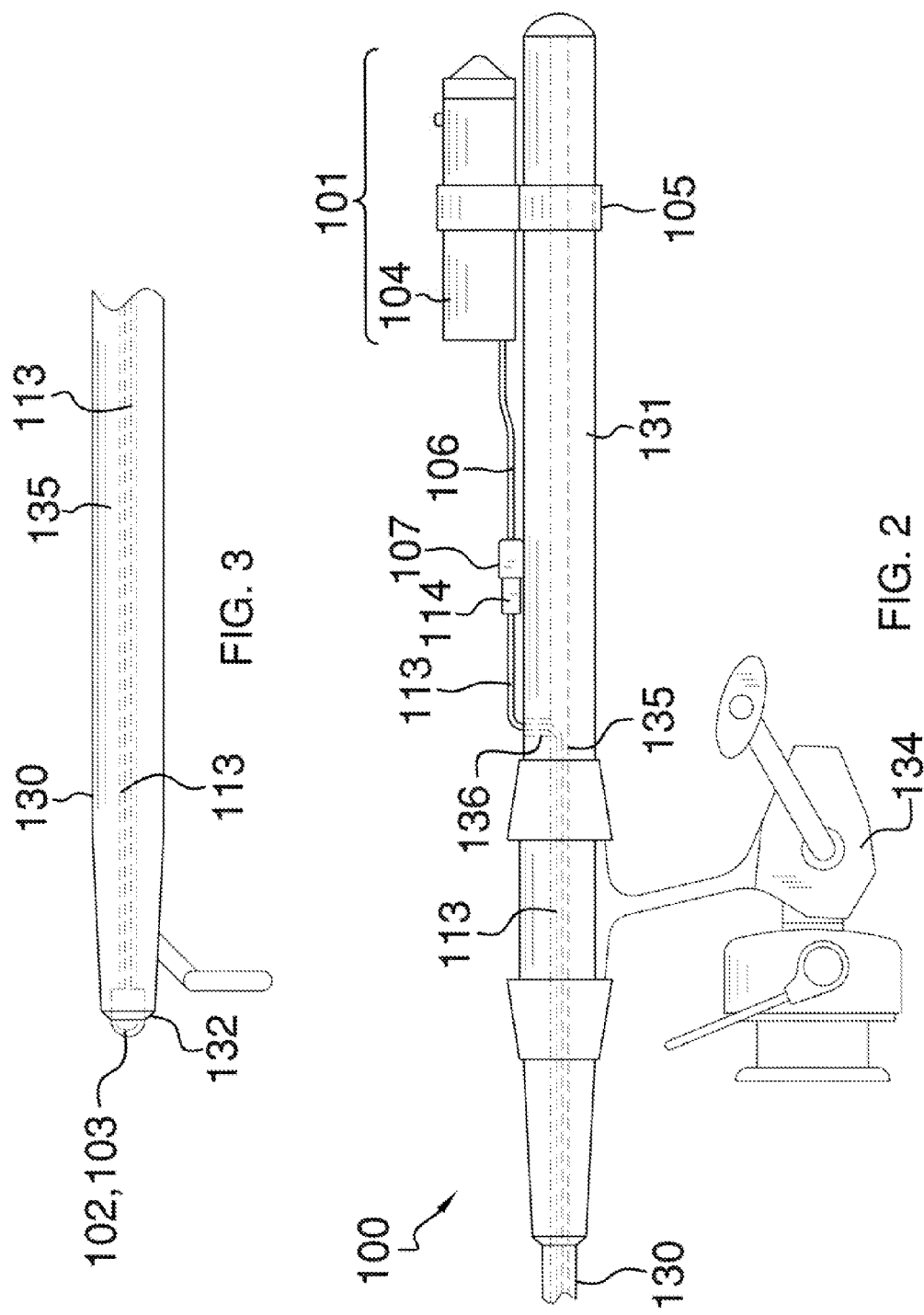

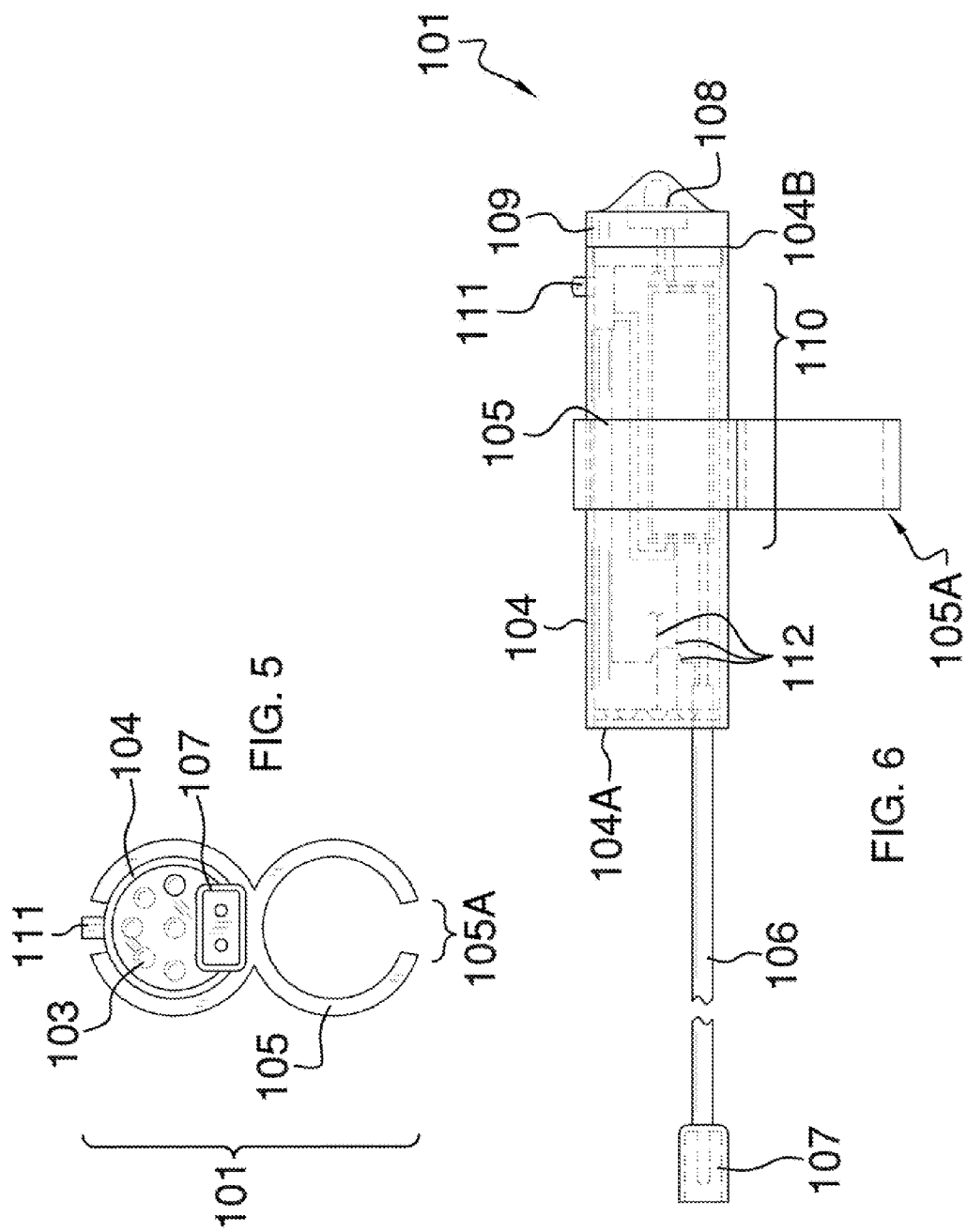

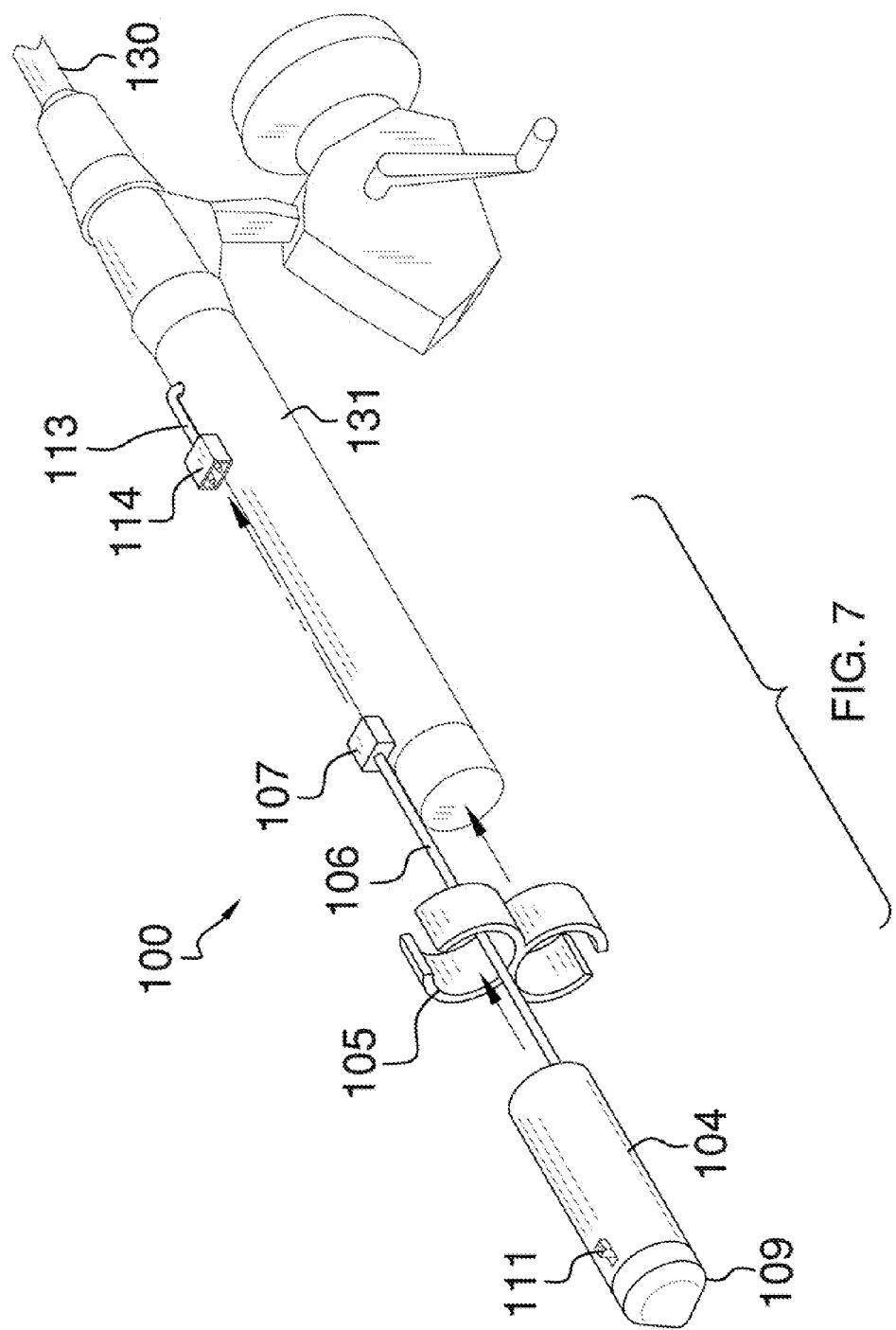

ILLUMINATING FISHING POLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing poles and rods, more specifically, an illuminated fishing pole.

B. Discussion of the Prior Art

As will be discussed immediately below, no prior art discloses a kit that when installed provides illumination at distal ends of a fishing pole; wherein the kit includes, a first illuminating member that attaches to the fishing pole via a bracket that clips onto the handle portion of the fishing pole, and which is in wired communication with a second illuminating member that is positioned at a distal end of the fishing pole such that both lighting means project light down the length of the fishing pole and away from the distal end; wherein wiring spans from the distal end inside of the fishing pole and to the first illuminating means; wherein a connector enables the first illuminating means and bracket to completely detach with respect to the fishing pole and the second illuminating means.

The Parker patent application Publication (U.S. Pub. No 2006/0288629) discloses a fishing pole that is transparent and has fiber optic lights on the inside of the pole so as to illuminate the pole at night. However, the fishing pole is directed to illumination of the pole itself, and not provide illumination down the length of said pole and from the distal end.

The Gonzagowski patent application Publication (U.S. Pub. No. 2010/0281753) discloses an illuminated fishing rod. However, the illuminated fishing rod does not provide illumination down the length of the fishing rod and from the distal end opposite of the handle.

The Huddelston et al. patent (U.S. Pat. No. 5,855,084) discloses a fishing pole tip illumination attachment. However, the illumination attachment does not incorporate illuminating means at the handle and at a distal end of the fishing pole.

The Ramirez patent (U.S. Pat. No. 7,337,577) discloses a fishing pole strike indicator comprising an illumination member attached to the pole. However, the indicator does not include two illumination sources, and does not illuminate along the length of the fishing pole.

The Matibe patent (U.S. Pat. No. 5,826,366) discloses an illuminated transparent fishing pole for use in night fishing in which the pole is filled with a substance that can be activated such as by a light source. Again, the pole is not illuminated from two locations.

While the above-described devices fulfill their respective and particular objects and requirements, they do not describe a kit that when installed provides illumination at distal ends of a fishing pole; wherein the kit includes a first illuminating member that attaches to the fishing pole via a bracket that clips onto the handle portion of the fishing pole, and which is in wired communication with a second illuminating member that is positioned at a distal end of the fishing pole such that both lighting means project light down the length of the fishing pole and away from the distal end; wherein wiring spans from the distal end inside of the fishing pole and to the first illuminating means; wherein a connector enables the first illuminating means and bracket to completely detach with respect to the fishing pole and the second illuminating means. In this regard, the illuminating fishing pole departs from the conventional concepts and designs of the prior art.

SUMMARY OF THE INVENTION

The illuminating fishing pole involves a kit that when installed provides illumination down the length of the fishing pole and at a distal end. A first illuminating member attaches to the handle portion of the fishing pole via a bracket that clips thereon. The first illuminating member directs light down the length of the fishing pole, and includes wiring that extends therefrom, through the interior of the fishing pole, and down to the second distal end where a second illuminating means is provided. The second illuminating means directs light away from the fishing pole and in the direction of casting a fishing line from said fishing pole. The wiring includes a connector to enable disconnection of the first illuminating means from the fishing pole. The first illuminating means and the second illuminating means include at least one light emitting diode thereon. The first illuminating means includes a powering means and two on/off switches to control operation of each light illuminating means.

It is an object of the invention to provide a kit that is installed upon an existing fishing pole or integrated into the design of a new fishing pole, and which directs light down the length of the fishing pole and away from a distal end of the fishing pole.

A further object of the invention is to provide a kit wherein a first illuminating means attaches at the handle portion of the fishing pole via a clip.

Another object of the invention is to provide wiring that extends from the first illuminating means to the second illuminating means such that control of both illuminating means is located at the first illuminating means.

An even further object of the invention is to provide a connector that enables the first illuminating means to disconnect from the second illuminating means, and also to detach from the handle portion of the fishing pole.

A further object of the invention is to provide a powering means located inside of housing of a first illuminating means and in wired communication with multiple control switches, which individually control electrical flow to lighting means located on both the first and second illuminating means.

These together with additional objects, features and advantages of the illuminating fishing pole will be readily apparent to those of ordinary skill in the art upon reading the following detailed description of presently preferred, but nonetheless illustrative, embodiments of the illuminating fishing pole when taken in conjunction with the accompanying drawings.

In this respect, before explaining the current embodiments of the illuminating fishing pole in detail, it is to be understood that the illuminating fishing pole is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminating fishing pole.

It is therefore important that the claims be regarded as including such equivalent construction insofar as they do not depart from the spirit and scope of the illuminating fishing pole. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a close up view of the first illuminating means attached to the handle portion of the fishing pole, and further detailing the connector in line of said wiring, which is partially depicted in broken lines as extending down the fishing pole;

FIG. 3 illustrates a close up view of the distal end with the second illuminating means installed thereon;

FIG. 5 illustrates an end view of the first illuminating means by itself;

FIG. 6 illustrates a detail of the first illuminating means in which the powering means is depicted in broken lines as within the housing of the first illuminating means, and with detail as to the two on/off switches provided for control of respective illuminating means; and FIG. 7 illustrates a perspective view of the installation of the first illuminating means and bracket to the handle portion of the fishing pole as well as connection of the connector used to transmit electricity to the second illuminating means.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
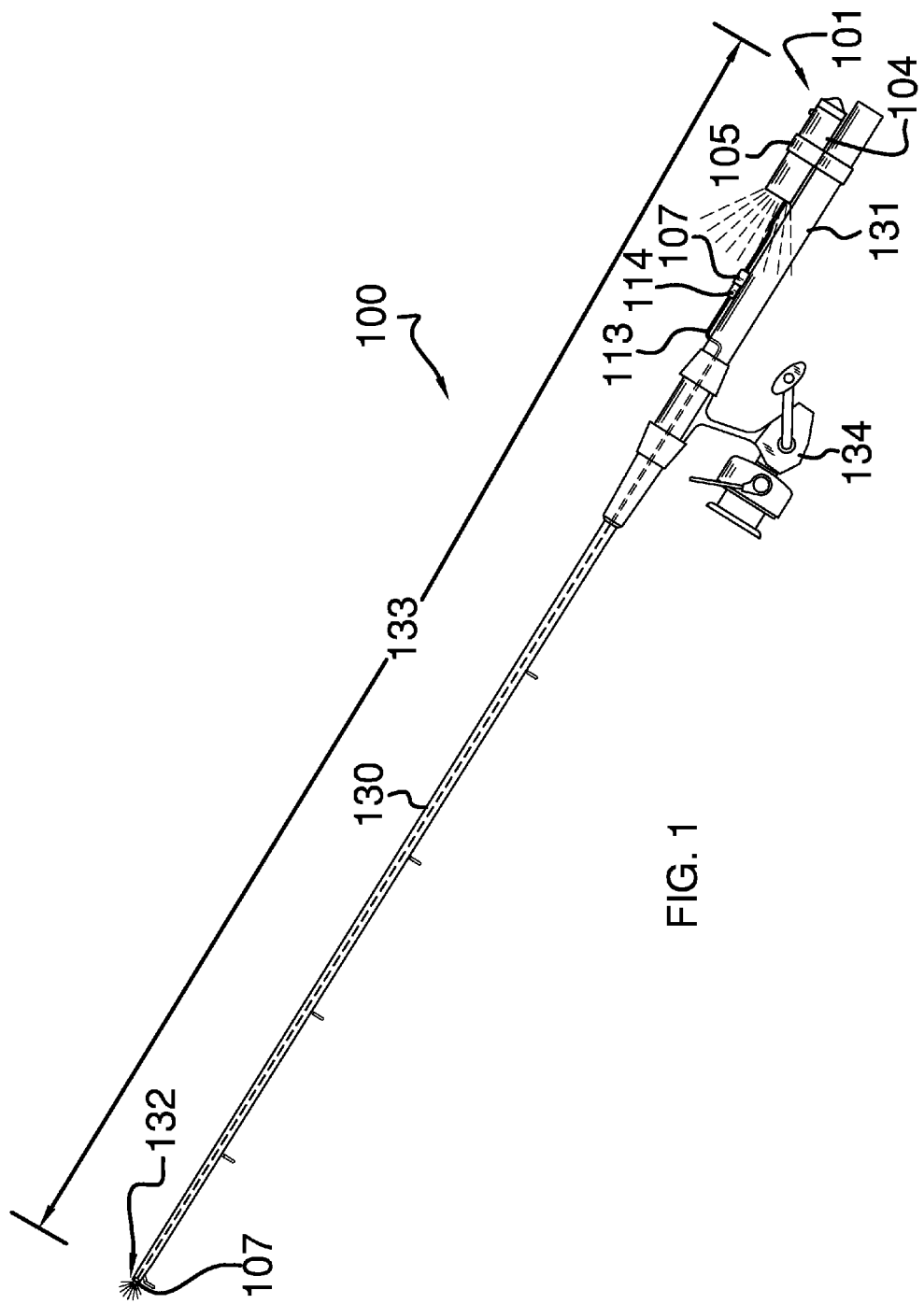
FIG. 1 illustrates a side view of the illuminating fishing pole wherein the wiring is depicted as broken lines spanning along the length of the fishing pole, and further detailing the direction of light emitting from both the first and second illuminating means.
Figure 4:
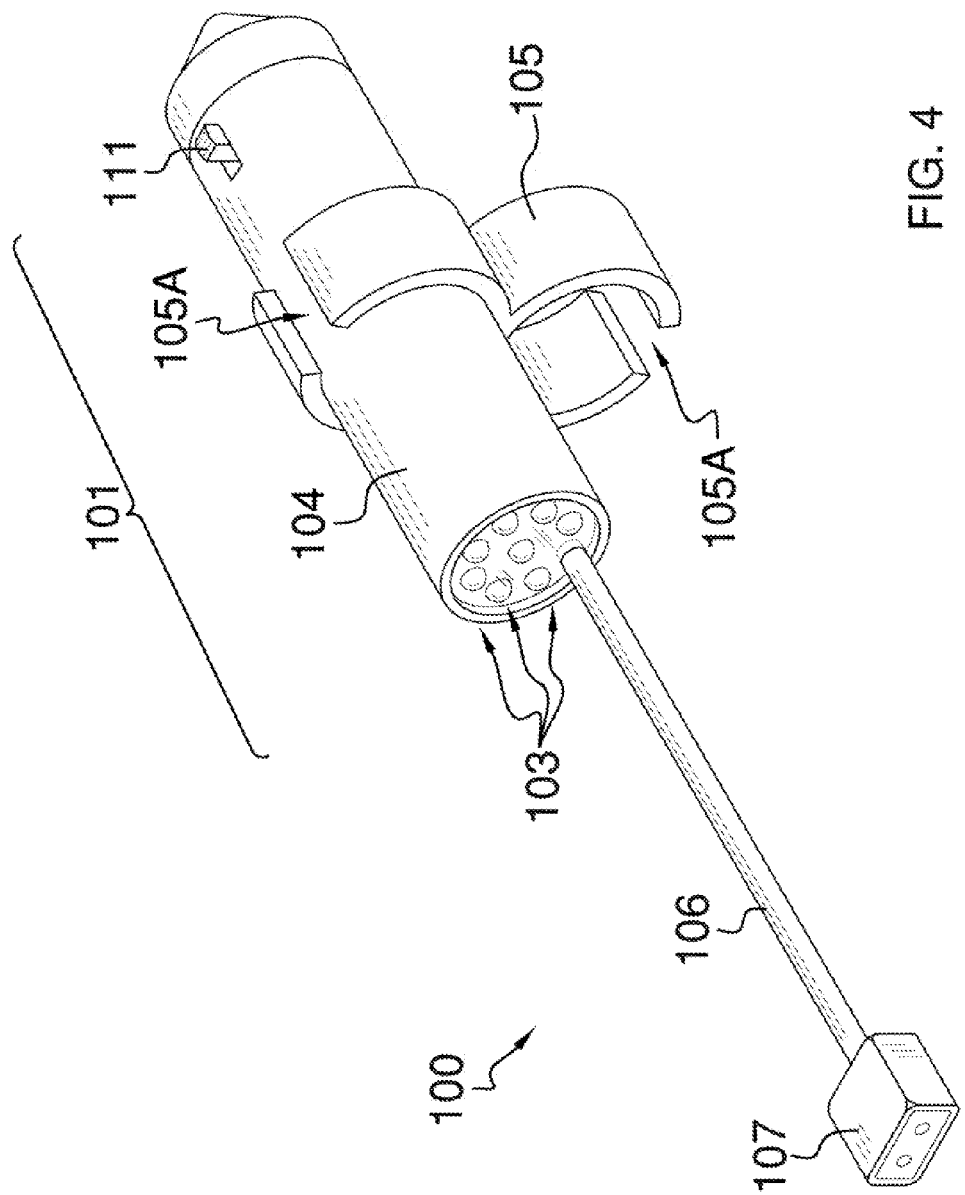
FIG. 4 illustrates a perspective view of the first illuminating means by itself.

Detailed reference will now be made to the preferred embodiment of the present invention, examples of which are illustrated in FIGS. 1-7. An illuminating fishing pole 100 (hereinafter invention) includes a first illuminating means 101 and a second illuminating means 102. Both the first illuminating means 101 and the second illuminating means 102 include at least one light emitting diode 103 thereon, which transmits light. It shall be noted that the first illuminating means 101 and the second illuminating means 102 both direct light in the same direction.

A fishing pole 130 may be outfitted or designed with the invention 100 in mind. More specifically, the invention 100 may be installed on a pre-existing fishing pole 130 or integrated into the construction of a new fishing pole 130. The fishing pole 130 is further defined as including a handle 131, a distal end 132. The distal end 132 is located on a farthest end with respect to the handle 131. The fishing pole 130 has a length 133. A fishing reel 134 is located forward of the handle 131.

The first illuminating means 101 includes a housing 104 from which a bracket 105 extends in parallel orientation therewith. The bracket 105 has a shape resembling an "8" in which a top and bottom portion of said "8" has slots 105A to enable attachment of either the housing 104 or the handle 131.

The housing 104 is a hollowed cylinder in which a forward end 104A supports a plurality of the light emitting diodes 103 thereon. A first wire 106 extends from the forward end 104A of the housing 104. The first wire 106 includes a first connector piece 107.

A rear housing end 104B includes a first on/off switch 108, which controls the light emitting diodes 103 of the first illuminating means 101. A screw on end cap 109 is included with the housing 104, and encloses the first on/off switch 108. The screw on end cap 109 includes a flexible membrane that is impermeable, and that encloses the first on/off switch 108, but enables the on/off switch 108 to be manipulated.

The housing 104 includes powering means 110 therein, which consist of at least one battery that is used to supply electricity to the invention 100. The housing 104 also includes a second on/off switch 111 that is located between the forward end 104A and the rear end 104B, and which is responsible for operation of the second illuminating means 102. The first on/off switch 108 and the second on/off switch 111 are both in wired communication with the powering means 110, and the respective light emitting diode(s) 103. Referring to FIG. 6, a plurality of wires 112 connect the powering means 110 to either the first illuminating means 101 and the second illuminating means 102 and the respective first on/off switch 108 and the second on/off switch 111.

The second illuminating means 102 is connected to a second wiring 113. The second wiring 113 includes a second connector piece 114 that can connect with the first connector piece 107 in order to enable electricity to flow from the second on/off switch 111 located in the housing 104 to the second illuminating means 102 located at the distal end 132 of the fishing pole 130. The second wiring 113 is of an undefined length, and spans a majority of the length 133 of the fishing pole 130. Moreover, a majority of the second wiring 113 spans along an interior cavity 135 of the fishing pole 130. The interior cavity 135 shall span at least from the handle 131 to the distal end 132. That being said, the fishing pole 130 shall include a wiring hole 136 that enables the second wiring 113 and the second connector piece 114 to exit from the interior cavity 135, and to enable connection of the first connector piece 107 with the second connector piece 114.

Referring to FIG. 7, the first illuminating means 101 is capable of full detachment with respect to the fishing pole 130 as well as disconnection with the second illuminating means 102. The bracket 108 supports the first illuminating means 101 in parallel orientation with both the fishing pole 130 and the handle 131 so as to direct light from the light emitting diodes 103 down the length 133 of the fishing pole 130. The first connector piece 107 connects and disconnects with the second connector piece 114 as needed to provide electricity to the second illuminating means 102. The bracket 105 may be slideable engaged onto both the handle 131 and the housing 104 as illustrated in FIG. 7.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An illuminating fishing pole comprising:
   a first illuminating means and a second illuminating means;
   wherein the first illuminating means is capable of attachment with a handle of a fishing pole and directs light down a length of said fishing pole whereas the second illuminating means directs light away from a distal end of said fishing pole; wherein the first illuminating means and the second illuminating means are powered and controlled at said handle of the fishing pole;
   wherein the distal end is located on a farthest end with respect to the handle of the fishing pole;
   wherein the first illuminating means includes a housing from which a bracket extends in parallel orientation therewith; wherein the bracket supports the first illuminating means in parallel orientation with respect to the fishing pole;
   wherein the bracket has a shape resembling an "8" in which a top and bottom portion of said "8" has slots to enable attachment of either the housing or the handle therewith;
   wherein the housing is a hollowed cylinder in which a forward end supports a plurality of light emitting diodes thereon; wherein a first wire extends from the forward end of the housing, and includes a first connector piece;
   wherein a rear housing end at which includes a first on/off switch that controls the first illuminating means; wherein a screw on end cap is included with the housing, and encloses the first on/off switch; wherein the screw on end cap includes a flexible membrane that is impermeable, and that encloses the first on/off switch;
   wherein the housing includes powering means therein, which consist of at least one battery that is used to supply electricity to the first illuminating means and the second illuminating means;
   wherein the housing includes a second on/off switch, which is responsible for operation of the second illuminating means; wherein both the first on/off switch and the second on/off switch are both in wired communication with the powering means;
   wherein the second illuminating means is connected to a second wiring, which includes a second connector piece that connects with the first connector piece in order to enable electricity to flow from the second on/off switch located in the housing to the second illuminating means located at the distal end of the fishing pole;
   wherein the second wiring spans a majority of the length of the fishing pole via an interior cavity of the fishing pole; wherein the interior cavity spans from at least the handle to the distal end;
   wherein the fishing pole includes a wiring hole that enables the second wiring and the second connector piece to exit from the interior cavity, and to enable connection of the first connector piece with the second connector piece.

2. The illuminating fishing pole as described in claim 1 wherein the both the first illuminating means and the second illuminating means include at least one light emitting diode thereon, which transmits light.

3. The illuminating fishing pole as described in claim 1 wherein the first illuminating means and the second illuminating means both direct light in the same direction.

4. An illuminating fishing pole comprising:
   a first illuminating means and a second illuminating means;
   wherein the first illuminating means is capable of attachment with a handle of a fishing pole and directs light down a length of said fishing pole whereas the second illuminating means directs light away from a distal end of said fishing pole; wherein the first illuminating means and the second illuminating means are powered and controlled at said handle of the fishing pole;
   wherein the first illuminating means and the second illuminating means both direct light in the same direction;
   wherein the distal end is located on a farthest end with respect to the handle of the fishing pole;
   wherein the first illuminating means includes a housing from which a bracket extends in parallel orientation therewith; wherein the bracket supports the first illuminating means in parallel orientation with respect to the fishing pole;
   wherein the bracket has a shape resembling an "8" in which a top and bottom portion of said "8" has slots to enable attachment of either the housing or the handle therewith; wherein the housing is a hollowed cylinder in which a forward end supports a plurality of light emitting diodes thereon; wherein a first wire extends from the forward end of the housing, and includes a first connector piece;
   wherein a rear housing end at which includes a first on/off switch that controls the first illuminating means; wherein a screw on end cap is included with the housing, and encloses the first on/off switch; wherein the screw on end cap includes a flexible membrane that is impermeable, and that encloses the first on/off switch; wherein the housing includes powering means therein, which consist of at least one battery that is used to supply electricity to the first illuminating means and the second illuminating means;
   wherein the housing includes a second on/off switch, which is responsible for operation of the second illuminating means; wherein both the first on/off switch and the second on/off switch are both in wired communication with the powering means;
   wherein the second illuminating means is connected to a second wiring, which includes a second connector piece that connects with the first connector piece in order to enable electricity to flow from the second on/off switch located in the housing to the second illuminating means located at the distal end of the fishing pole;
   wherein the second wiring spans a majority of the length of the fishing pole via an interior cavity of the fishing pole; wherein the interior cavity spans from at least the handle to the distal end; wherein the fishing pole includes a wiring hole that enables the second wiring and the second connector piece to exit from the interior cavity, and to enable connection of the first connector piece with the second connector piece.

5. The illuminating fishing pole as described in claim 4 wherein the both the first illuminating means and the second illuminating means include at least one light emitting diode thereon, which transmits light.

* * * * *